US008479046B1

(12) United States Patent
Bailey et al.

(10) Patent No.: US 8,479,046 B1
(45) Date of Patent: Jul. 2, 2013

(54) SYSTEMS, METHODS, AND COMPUTER READABLE MEDIA FOR TRACKING POOL STORAGE SPACE RESERVATIONS

(75) Inventors: Charles Christopher Bailey, Cary, NC (US); Miles Aram de Forest, Bahama, NC (US); David Haase, Fuquay Varina, NC (US); Saurabh M. Pathak, Jersey City, NJ (US); Chetan Rameshchandra Vaidya, Morrisville, NC (US); Paul T. McGrath, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 200 days.

(21) Appl. No.: 12/824,966

(22) Filed: Jun. 28, 2010

(51) Int. Cl.
*G06F 11/00* (2006.01)
(52) U.S. Cl.
USPC .................................... 714/25; 714/48; 714/2
(58) Field of Classification Search
USPC ............................................. 714/23, 6.1, 4.11
See application file for complete search history.

(56) References Cited

U.S. PATENT DOCUMENTS

| 2003/0145167 | A1 | 7/2003 | Tomita |
| 2003/0208703 | A1* | 11/2003 | Goodman et al. ................ 714/5 |
| 2004/0049564 | A1* | 3/2004 | Ng et al. ....................... 709/223 |
| 2008/0250272 | A1* | 10/2008 | Barnes et al. .................... 714/15 |
| 2009/0030956 | A1 | 1/2009 | Zhang et al. |
| 2010/0106907 | A1* | 4/2010 | Noguchi et al. ............... 711/114 |

OTHER PUBLICATIONS

Commonly-assigned, co-pending U.S. Appl. No. 12/751,707 for "Systems, Methods, and Computer Readable Media for Performance Optimization of Storage Allocation to Virtual Logical Units," (Unpublished, filed Mar. 31, 2010).
Non-Final Official Action for U.S. Appl. No. 12/751,707 (Mar. 21, 2012).
Final Official Action for U.S. Appl. No. 12/751,707 (Aug. 7, 2012).

* cited by examiner

*Primary Examiner* — Scott Baderman
*Assistant Examiner* — Sarai Butler
(74) *Attorney, Agent, or Firm* — Jenkins, Wilson, Taylor & Hunt, P.A.

(57) ABSTRACT

Systems, methods, and computer readable media for tracking storage pool reservations are disclosed. According to one aspect, the subject matter described herein includes a system for tracking storage pool reservations. The system includes a storage entity having data storage space for storing data, the data storage space being divided into a plurality of slices. The system also includes one or more portions of non-volatile memory, different from the data storage space, for storing slice reservation statistics and information about requests that affect slice reservation statistics, wherein storing information in the portion of non-volatile memory is an atomic operation. The system further includes a control module for receiving a request that affect slice reservation statistics, storing information about the request in the portion of non-volatile memory, performing the request, and updating the slice reservation statistics and clearing the information about the request in the portion of non-volatile memory.

23 Claims, 6 Drawing Sheets

SYSTEMS, METHODS, AND COMPUTER READABLE MEDIA FOR TRACKING POOL STORAGE SPACE RESERVATIONS

RELATED APPLICATIONS

This application is related to commonly assigned, co-pending U.S. patent application Ser. No. 12/751,707, filed on Mar. 31, 2010, the disclosure of which is incorporated herein by reference in its entirety.

TECHNICAL FIELD

The subject matter described herein relates to methods and systems for data storage, backup, and recovery. More particularly, the subject matter described herein relates to systems, methods, and computer readable media for tracking pool storage space reservations.

BACKGROUND

Data storage systems, such as disk storage arrays, are called upon to store and manage increasingly larger amounts of data, e.g., in gigabytes, terabytes, petabytes, and beyond. As a result, it is increasingly common or necessary that this large amount of data be distributed across multiple hard disk drives or other storage entities. Some conventional systems treat the collection of storage devices as a unified pool of data storage space that is divided into equal sized portions or slices, where a slice may be as small as a single sector on a hard disk (e.g., 512 bytes) or as large as an entire hard disk drive, or even multiple hard disk drives.

One or more portions may be organized into collections called logical units. This process is referred to as allocating a slice to a logical unit. Once a slice has been allocated to a logical unit, that slice is exclusively used by the logical unit. Slices that have not been organized into or associated with a logical unit are referred to as unallocated slices. A logical unit can be a subset of a single storage device, e.g., a hard disk drive may contain multiple logical units; a logical unit can be an entire storage device; and a logical unit can span multiple storage devices, e.g., a logical unit may be distributed across multiple storage devices organized into a redundant array of inexpensive disks (RAID) array.

In some conventional systems, a storage administrator may be required to fully allocate an LU at creation time. That is, a storage administrator may request an LU consisting of a specified size and a storage system may allocate slices to meet the specified size. Recognizing that more storage space may be allocated than may actually be used at first, the concept of a sparsely populated or "thin" logical unit (TLU) was developed. Unlike the more traditional "fat" or fully allocated logical unit (FLU), which is created by provisioning and allocating a certain amount of storage area, a TLU is provisioned at creation but is not allocated any physical storage until the storage is actually needed.

Recently, a new type of LU has been contemplated which combines features of both FLUs and TLUs, known as a Direct LU (DLU). In one example, a DLU may be seen as fully provisioned by a user with a specified size, yet the specified size may in fact represent reserved storage space. To ensure that space reservations can be honored and that storage space in a pool is not overbooked, it is important to track pool storage space reservations. For example, a storage system may maintain the amount of reserved storage space needed for each DLU or other LU with reserved storage space and the amount of available or unreserved storage space for determining whether further reservations may be made.

Accordingly, there exists a need for systems, methods, and computer readable media for tracking pool storage space reservations.

SUMMARY

According to one aspect, the subject matter described herein includes a system for tracking pool storage space reservations. The system includes a storage entity having data storage space for storing data, the data storage space being divided into a plurality of slices. The system also includes one or more portions of non-volatile memory, different from the data storage space, for storing slice reservation statistics and information about requests that affect slice reservation statistics, wherein storing information in the portion of non-volatile memory is an atomic operation. The system further includes a control module for receiving a request that affect slice reservation statistics, storing information about the request in the portion of non-volatile memory, performing the request, and updating the slice reservation statistics and clearing the information about the request in the portion of non-volatile memory.

According to another aspect, the subject matter described herein includes a method for tracking pool storage space reservations. The method occurs at a storage entity having data storage space for storing data, the data storage space being divided into a plurality of slices. The method includes receiving a request that affects slice reservation statistics. The method also includes storing information about the request in a portion of non-volatile memory that stores slice reservation statistics, wherein storing information in the portion of non-volatile memory is an atomic operation. The method further includes performing the request. The method also includes updating the slice reservation statistics and clearing the stored information about the request in the portion of non-volatile memory, wherein storing information in the non-volatile memory is an atomic operation.

The subject matter described herein for tracking pool storage space reservations may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for tracking pool storage space reservations. Reference will now be made in detail to exemplary embodiments of the present invention, examples of which are illustrated in the accompanying drawings. Wherever possible, the same reference numbers will be used throughout the drawings to refer to the same or like parts.

Figure 1A:
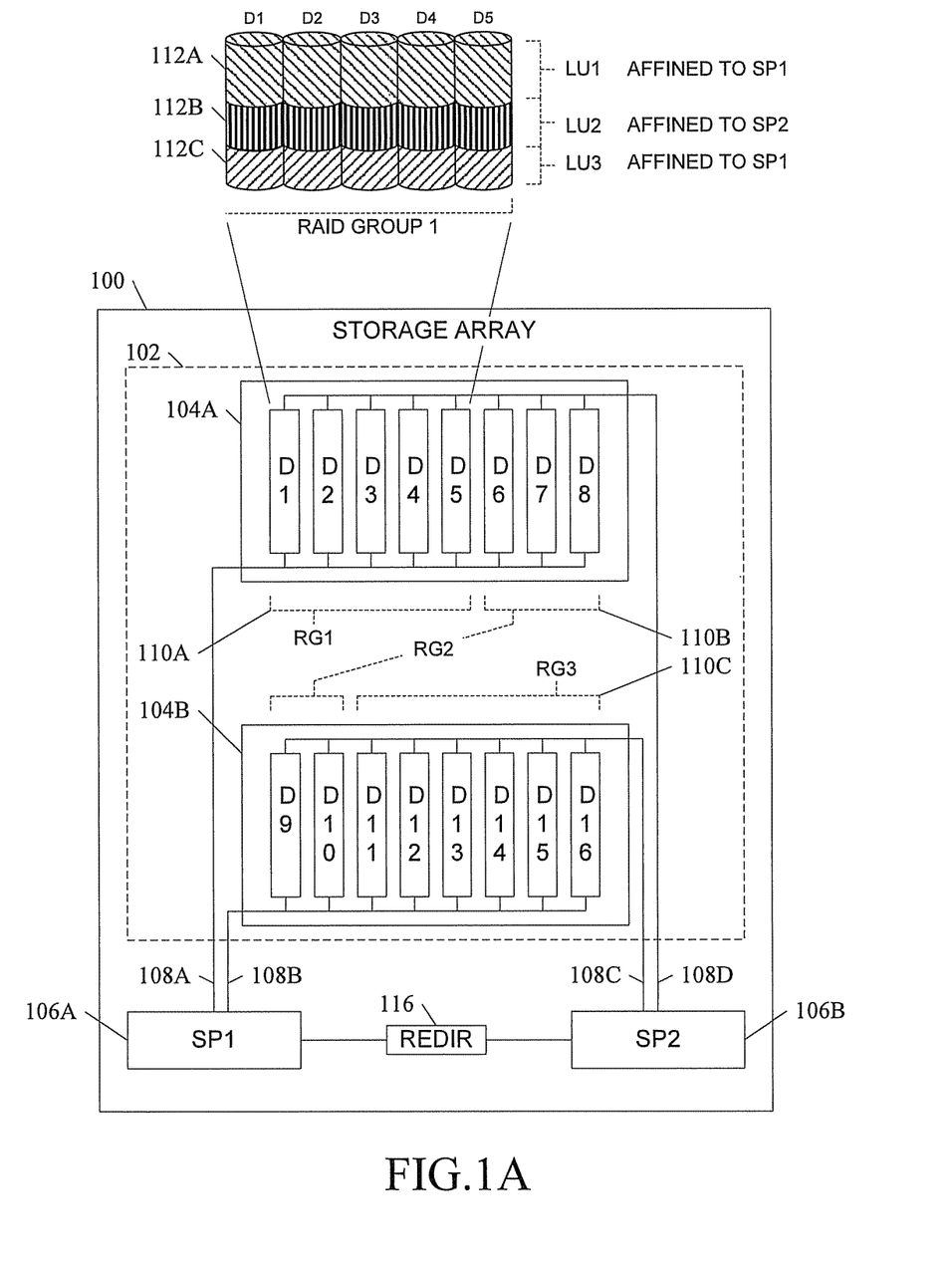
FIG. 1A is a block diagram illustrating an exemplary system for tracking pool storage space reservations according to an embodiment of the subject matter described herein.

FIG. 1A is a block diagram illustrating a system for allocating physical storage in a storage array according to an embodiment of the subject matter described herein. Storage array 100 includes multiple storage devices 102, which are typically hard disk drives, but which may be tape drives, flash memory, flash drives, other solid state drives, or some combination of the above. In one embodiment, the storage devices may be organized into multiple shelves 104, each shelf containing multiple devices 102. In the embodiment illustrated in FIG. 1A, storage array 100 includes two shelves, Shelf1 104A and Shelf2 104B; Shelf1 104A contains eight storage devices, D1-D8, and Shelf2 also contains eight storage devices, D9-D16.

Storage array 100 may include one or more storage processors 106, for handling input/output (I/O) requests, reservation requests, and related operations, such as slice allocations, slice deallocations, reservation increases, and reservations decreases. Each storage processor 106 may communicate with storage devices 102 through one or more data buses 108. In one embodiment, storage array 100 contains two storage processors, SP1 106A, and SP2 106B, and each storage processor 106 has a dedicated data bus 108 for each shelf 104. For example, SP1 106A is connected to each storage device 102 on Shelf1 104A via a first data bus 108A and to each storage device 102 on Shelf2 104B via a second data bus 108B. SP2 106 is connected to each storage device 102 on Shelf1 104A via a third data bus 108C and to each storage device 102 on Shelf2 104B via a fourth data bus 108D. In this manner, each device 102 is configured to be connected to two separate data buses 108, one to each storage processor 106. For example, storage devices D1-D8 may be connected to data buses 108A and 108C, while storage devices D9-D16 may be connected to data buses 108B and 108D. Thus, each device 102 is connected via some data bus to both SP1 106A and SP2 106B. The configuration of storage array 100, as illustrated in FIG. 1A, is for illustrative purposes only, and is not considered a limitation of the subject matter described herein.

In addition to the physical configuration, storage devices 102 may also be logically configured. For example, multiple storage devices 102 may be organized into redundant array of inexpensive disks (RAID) groups, or RGs 110, shown in FIG. 1A as RG1 110A, RG2 110B, and RG3 110C. Storage devices D1-D5 are organized into a first RAID group, RG1 110A, while storage devices D6-D10 are organized into a second RAID group, RG2 110B. Storage devices D12-D16 are organized into a third RAID group, RG3 110C. In one embodiment, a RAID group may span multiple shelves and/or multiple buses. For example, RG2 110B includes storage devices from both Shelf1 104A and Shelf2 104B.

Although RAID groups are composed of multiple storage devices, a RAID group may be conceptually treated as if it were a single storage device.

As used herein, the term "storage entity" may refer to either a single storage device or a RAID group operating as a single storage device.

Storage entities may be further sub-divided into logical units. A single RAID group or individual storage device may contain one or more logical units, also referred to as LUs. Each logical unit may be further subdivided into portions of a logical unit, referred to as "slices". In one embodiment, slices are equal-sized portions of storage space, e.g., a gigabyte (1 GB) in size. In the embodiment illustrated in FIG. 1A, RG1, which includes storage devices D1-D5, is sub-divided into 3 logical units, LU1 112A, LU2 112B, and LU3 112C.

Figure 1B:
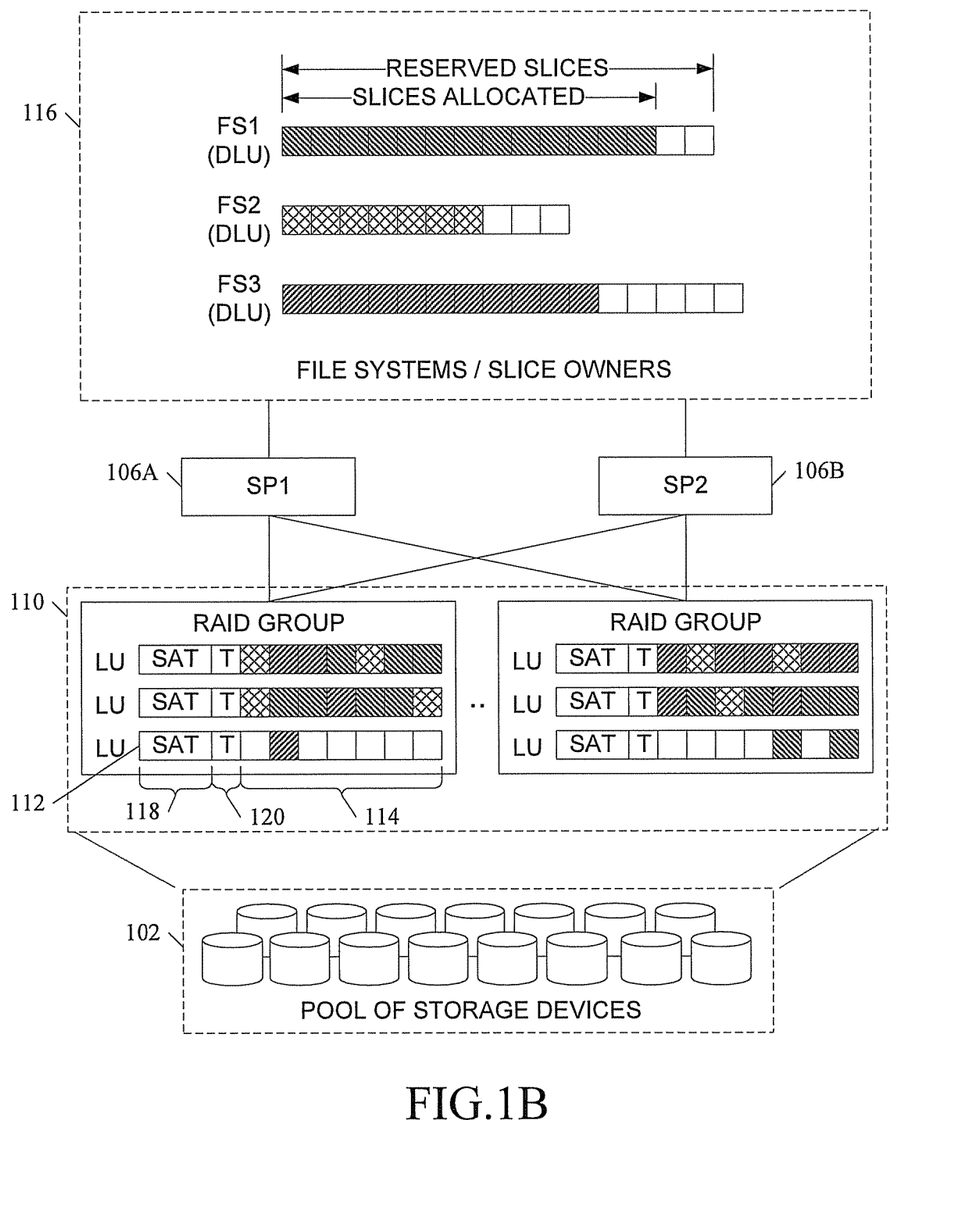
FIG. 1B is a block diagram illustrating another view of an exemplary system for tracking pool storage space reservations according to an embodiment of the subject matter described herein.

FIG. 1B is a block diagram illustrating another view of a system for allocating physical storage in a storage array according to an embodiment of the subject matter described herein. In the simplified view shown in FIG. 1B, a pool of storage devices 102 are organized into multiple RAID groups 110, and each RAID group is further divided into a number of LUs. Slices 114 may be allocated to one or more mapped LUs for use by users of storage array 100. As used herein, a mapped LU refers to a logical portion of storage space that represent contiguous and/or non-contiguous physical storage space, where mapping allows for physical storage space to be dynamically linked together at a time of use into a logically contiguous address space. Exemplary examples of mapped LUs may include TLUs and DLUs.

In the embodiment shown in FIG. 1B, LUs may be implemented using file systems (e.g., common block file systems (CBFSs)) or other storage architecture. In some embodiments, LUs may be implemented using additional or different architecture (e.g., without traditional file systems). As used hereinafter, a file system (FS) 116 is a collection of slices and may be referred to as the slice owner of the collection of slices by the storage system. An FS 116 may represent a drive, a volume, or storage space for use by a user of storage array 100. In one embodiment, FS 116 may refer to a direct LUN (DLU) for use by a user of the storage array 100.

A DLU may be a fully provisioned mapped LU with coarse mapping. In particular, a DLU or FS 116 may be associated with a reserved space size and an actual space size. The reserved size may be the size presented to the user. The actual size is determined by the number of slices actually allocated to FS 116. The slices that are allocated to an FS 116 may be physically or virtually located anywhere in storage array 100 and may depend on a variety of factors, e.g., a slice allocation policy, user's requirements, and storage array configuration. For example, slices of an FS 116 may be physically located contiguously or non-contiguously in storage devices 102 and/or logically located contiguously or non-contiguously in LUs 112.

In one embodiment, storage processors 106 may be responsible for reserving and allocating storage space. Additionally, storage processors 106 may maintain information about that reserved and/or allocated storage space. For example, storage processors 106 may be responsible for determining whether an FS 116 have reserved slices left to allocate and whether a storage pool has available slices for reservation or consumption.

In one embodiment, storage processor 106 may maintain information about an FS 116 whose contents are being stored in the allocated slices, including the amount of reserved slices that FS 116 has requested. In one implementation of storage array 100, each logical unit 112 is associated with a slice allocation table (SAT) 118, which is used to record information about each slice 114, such as whether the slice is free or allocated and, if it is allocated, to which slice owning entity (e.g., FS 116). SAT 118 may be stored in logical unit 112, or it may be stored outside logical unit 112 to which it is associated. Each logical unit may also be associated with one or more transactional sectors (T-sectors) 120, which may be used in tracking pool storage space reservations.

Figure 2:
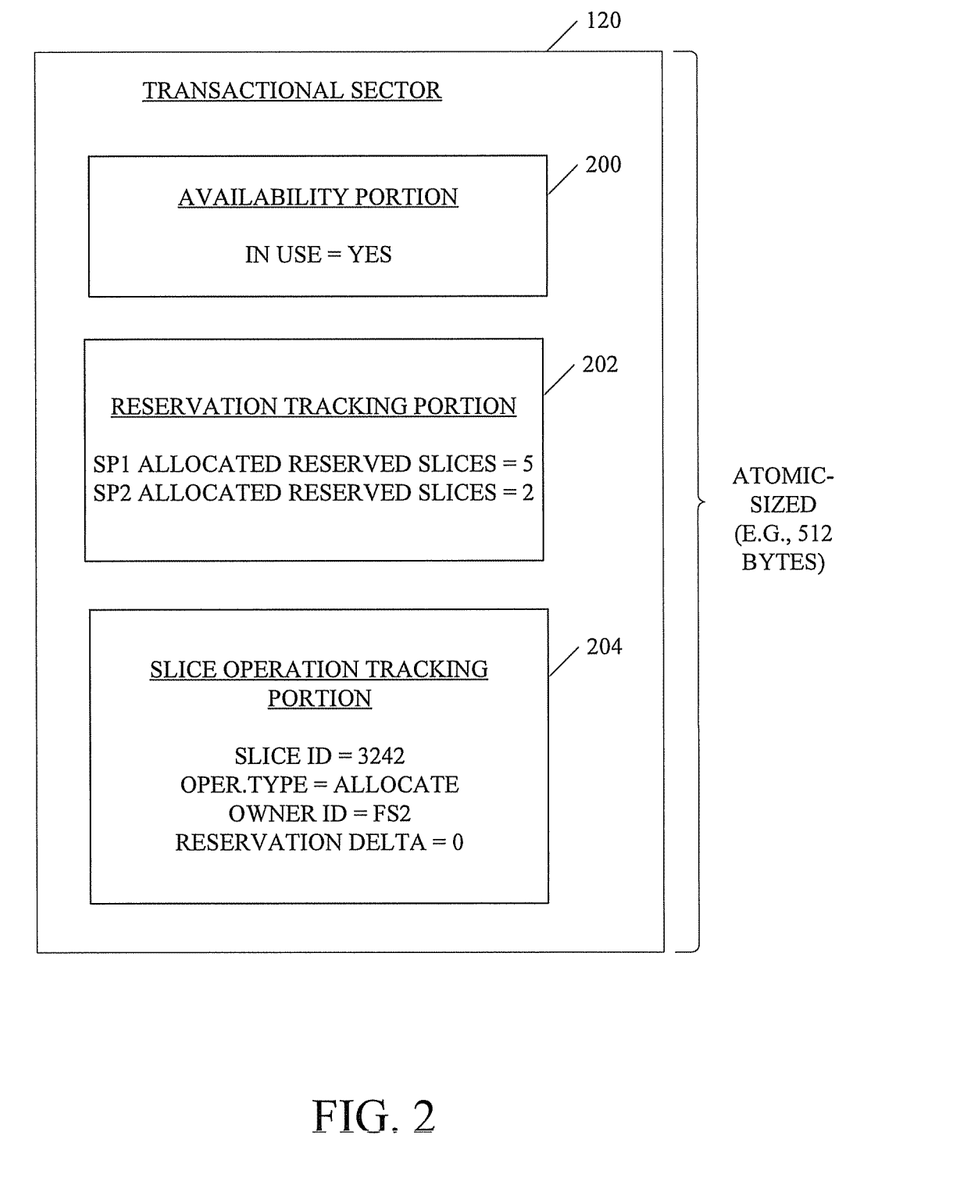
FIG. 2 is a block diagram illustrating an exemplary transactional sector for use in tracking pool storage space reservations according to an embodiment of the subject matter described herein.

FIG. 2 is a block diagram illustrating a transactional sector for tracking reservations according to an embodiment of the subject matter described herein. In the embodiment shown in FIG. 2, a transactional sector (T-sector) 120 represents memory used as a reservation tracking data structure for maintaining slice reservation statistics and related information. In one embodiment, T-sector 120 may be a portion of non-volatile memory and, as such, statistics stored in the T-sector 120 may be retrievable in case of a fault (e.g., a power outage or other failure where statistics stored in a volatile location is unreliable).

T-sectors 120 may be various sizes. In one embodiment, each T-sector 120 is of a size such that the entry can be updated using an atomic operation. For example, each T-sector 120 may be the size of a single disk sector (e.g., 512 bytes) of a storage device 104, or whatever size can be written in a single I/O write to a storage entity. In this example, a T-sector 120 being the size of a single disk sector may ensure read and write atomicity. As used herein, an atomic operation refers to one or more operations that appear to be an operation with only two possible outcomes: success or failure. For example, an atomic write is one in which all or no part of the write is committed to the disk such that after a failure all of the data is either written to the disk or the disk is in the state it was in before the write began (i.e., no partial data is written to the disk).

T-sectors 120 may be located in one or more locations at a storage entity (e.g., a storage array 100). In one embodiment, one or more T-sectors 120 may be located at LUs (e.g., LUs 112) organized from a pool of storage devices. For example, three T-sectors 120 may be located at each LU. In this example, one T-sector 120 from each LU may be used for tracking storage reservations while the other T-sectors 120 may be reserved for future use, e.g., to circumvent or lessen T-sector contention between SPs, or modules therein. In one embodiment, one or more T-sectors 120 may be located in metadata portions of LUs. For example, a LU may include metadata portions logically and/or physically located in this respective order: an LU header, a slice allocation table (SAT), and an SAT expansion space. In one embodiment, one or more T-sectors 120 may be located after SAT expansion space. Additionally, an LU header may contain location information (e.g., a block offset in table of content (TOC) entry) indicating where the T-sectors 120 are located.

Storage space may be provisioned for T-sectors 120 at LU creation time or after LU creation time. For example, T-sectors 12n may be included in previously created LUs by re-designating a portion of metadata space. In one embodiment, for all LUs created without T-sectors 120, space for one or more T-sectors 120 may be provisioned upward from the bottom of a designated SAT expansion space. For example, space may be re-designated from the highest disk offset amount associated with the SAT expansion space upward until 1-sectors 120 are provisioned.

For all new LUs to be created, space for T-sectors may be provisioned for during creation and may be located after SAT expansion space. It will be appreciated that previously provisioned LUs where T-sectors are added may have less metadata space (e.g., a smaller SAT expansion space) than new LUs where 1-sectors are accounted for during creation.

Padding space may continue to exist in previously created LUs and may be included in new LUs for ensuring proper slice alignment. For example, in a disk-based environment, padding space may be added to a LU's metadata portion such that each slice begins and ends on physical disk sector boundaries. That is, where a 1 GB slice is 1,000,000,000 bytes and a disk sector is 512 bytes, a 1 GB slice may include 1,953,125 complete disk sectors).

In the embodiment shown in FIG. 2, T-sector 120 includes an availability (or usage) portion 200, a reservation tracking portion 202, and a slice operation tracking portion 204. As shown in FIG. 2, availability portion 200 may indicate whether a 1-sector is currently unavailable or available for use. In one embodiment, availability portion 200 may include a parameter for indicating one of two options, in use or available for use (i.e., free).

Reservation tracking portion (RTP) 202 may be used in maintaining slice reservation statistics. In one embodiment, RTP 202 may include statistics indicating the number of currently allocated slices that are reserved in a pool. For example, three file systems (FS) associated with a pool of storage may have a reserved storage amount totaling 30 slices (10 slices per FS). Each FS may have 5 slices currently allocated. In this example, RTP 202 may include statistics indicating that 15 slices are allocated of the 30 slice that are reserved in the pool. In the embodiment shown in FIG. 2, RTP 202 includes statistics maintained per SP. As shown, RTP 202 includes amounts for allocated reserved slices at SP1 and allocated reserved slices of SP2. As disclosed in greater detail below, statistics stored in T-sectors 120 associated with a pool may be used in reconstructing slice reservation statistics in case of a fault (e.g., in a case where in-memory statistics used by storage system during execution is corrupted or erased).

Slice operation tracking portion (SOTP) 204 may also be used in maintaining slice reservation statistics. In one embodiment, SOTP 202 may store information about an operation that may affect slice reservation statistics. For example, a file system (FS) associated with a pool of storage may have a reserved storage amount totaling 10 slices. The FS (or other entity) may send or trigger a slice allocation request that, if completed, will affect slice reservation statistics, such as the number of reserved slices yet to be allocated and the number of reserved slices currently consumed for the FS (and the pool totals).

SOTP 204 may include request information in a persistent manner such that, if a system fault occurs, the storage system may recover and complete the request. In the embodiment shown in FIG. 2, SOTP 204 includes parameters for a slice identifier, an operation type identifier, an owner identifier (e.g., a slice owning entity, such as a requesting or receiving FS), and a reservation delta. A slice identifier may indicate a particular slice related to the operation request (e.g., slice ID may identify a free slice for allocation in response to an allocation request or slice ID may indicate a consumed slice for de-allocation indicated by a de-allocation request). An operation type identifier may indicate the nature or kind of operation requested. For example, operation types may include allocations, de-allocations, compression-based migration, and user reservation. An owner identifier may indicate a particular slice owner related to the operation request (e.g., owner ID may identify an FS (or other client) that requests a reservation update or other operation).

A reservation delta indicates a change in the amount of reserved slices for a given slice owner (e.g., FS). For example, a reservation delta may be computed by subtracting a slice owner's current allocated space from the slice owner's total reserved space at an initial point in time and subtracting the slice owner's current allocated space from the slice owner's total reserved space at a subsequent point in time. In this example, adding the amounts from the initial point and the subsequent point is the delta amount. Reservation delta amounts may be positive or negative and may be represented by a signed byte or data type. In one embodiment, a reservation delta parameter may be used for requests that update a total reservations amount for an FS. For example, a slice owner (e.g., FS) may request that its reserved slice size be increased from 30 allocated slices to 50 slices. In this example, reservation delta amount may be positive 20 (i.e., (30−30)+(50−30)=+20). In a second example, a reservation decrease request may trigger a negative delta amount (i.e., (30−30)+(25−30)=−5). For example, in FIG. 2, information related to a slice allocation request is being stored in SOTP 204 and includes an identifier for the slice ("3242"), along with an operation type ("allocate slice"), the slice owner ("FS2"), and a reservation delta ("−1").

In alternative embodiments, a reservation delta amount may indicate a change in reserved slices that are currently consumed, reserved slices that are yet to be consumed, or total reserved slices for a slice owner (e.g., FS). In an embodiment where the reservation delta amount tracks changes in the number of reserved slices consumed, a slice allocation request (such as in the above example) may trigger a reservation delta amount of "+1". In an embodiment where the reservation delta amount tracks where the reservation delta amount tracks changes in the number of reserved slices yet to be consumed, a slice allocation request (such as in the above example) may trigger a reservation delta amount of "−1". In an embodiment where the reservation delta amount tracks changes in the number of total reserved slices for a slice owner, a slice allocation request (such as in the above example) may trigger a reservation delta amount of "0" since a total reservation amount for an FS is not being changed.

Storage system may store statistics, including slice reservation statistics, in various locations. In one embodiment, statistics may be stored in volatile memory, such as random access memory (RAM), for access during execution of storage system. Additionally, one or more statistics may be stored in a management database or data structure (e.g., a collection of data objects) located in non-volatile memory. In one embodiment, the information stored in volatile memory may be the same or substantially the same as the information stored in the management database.

In one embodiment, volatile memory is used as the work area or primary repository for storing information that the system needs during execution, while the management database functions as a non-volatile archive that is continually but asynchronously updated to reflect changes made to the statistics stored in volatile memory. Alternatively, the management database may be considered to be the master copy for all information, while volatile memory may be used as a working copy of the information, which is quickly accessed and into which changes are first recorded before being committed to the master copy stored in management database.

T-sectors 120 may be used by the storage system to recover one or more statistics in case of a system fault. In one embodiment, a storage system module (e.g., a slice manager) may perform a summation of slice consumption values stored in RTP 202 for all T-sectors 120 associated with a storage pool. For example, in a storage pool, each T-sector 120 may include an SP1 consumed reserved slice amount and an SP2 consumed reserve slice amount. If the SP1 consumed reserved slice amounts in all T-sectors 120 are added together, the total reserved storage pool consumption amount for SP1 may be determined. Similarly, if SP2 consumed reserved slice amounts in all T-sectors 120 are added together, the total reserved storage pool consumption amount for SP2 may be determined. Further, by adding the reserved storage pool consumption amounts of both SPs together, the total reserved storage pool consumption may be determined.

References will now be made to a plurality of exemplary reservation statistics that may be used in a storage system for monitoring or tracking pool storage space reservations. In particular, Table 1 illustrates some exemplary reservation counters and related information according to one embodiment of the present subject matter described herein.

In Table 1, reservation counters are provided for three different subsystems or modules, a pool manager, an FS manager, and a slice manager. In one embodiment, a control module may include one or more of these modules. In a second embodiment, a control module may be operatively associated with a pool manager, an FS manager, and a slice manager. In one embodiment, modules include software that is executed on at least one SP of a storage system.

TABLE 1

Exemplary Reservation Counters

| Reservation Counter | Managing Sub-System | Description/Usage | Resident of |
|---|---|---|---|
| SP1 Pool Reservation | Pool Manager | Sum of all the file system reservations where SP1 is handling the reservations | Pool Object |
| SP2 Pool Reservation | Pool Manager | Sum of all the file system reservations where SP2 is handling the reservations | Pool Object |
| Total FS Reservation | FS Manager | Total storage space reserved for a file system | FS Object |
| Consumed Slices | FS Manager | Total storage space consumed by a file system. | FS Object |
| SP1 Pool Reservation | Slice Manager | Sum of all the file system reservations where SP1 is handling the reservations | SM Pool Object |
| SP2 Pool Reservation | Slice Manager | Sum of all the file system reservations where SP2 is handling the reservations | SM Pool Object |
| SP1 Remaining Pool Reservation | Slice Manager | Reserved storage left to be allocated on SP1 | SM Pool Object |
| SP2 Remaining Pool Reservation | Slice Manager | Reserved storage left to be allocated on SP2 | SM Pool Object |

In one embodiment, the pool manager is responsible for one or more pool objects. Each pool object represent a plurality of storage devices organized into a pool of storage space and may maintain one or more reservation counters. In one embodiment, each pool object may maintain a counter for each SP 106, such as SP1 106 and SP2 106. For example, a pool object may include a SP1 pool reservation counter that indicates the sum of all the file system reservations in a pool where SP1 is handling the reservations and a SP2 pool reservation counter that indicates the sum of all the file system reservations in a pool where SP2 is handling the reservations. In one embodiment, pool object counters may be initialized and/or updated based on various actions, e.g., when an FS 116 (e.g., a DLU) is created or destroyed, when reserving or unreserving storage space for an FS 116, and when compressing an FS 116. Pool counters may be stored in a non-volatile management database and/or in a volatile memory.

In one embodiment, the FS manager is responsible for one or more FS objects. Each FS object represents an FS 116 and may include one or more reservation counters. In one embodiment, an FS object includes a total FS reservation counter that indicates the total storage space reserved for an FS 116 (the reserved or specified size of FS 116). In one embodiment, the total reservation counter may be initialized and/or updated based on various actions, e.g., when an FS 116 (e.g., a DLU) is created or destroyed, when reserving or un-reserving storage space for an FS 116, and when compressing FS 116. The total reservation counters may be stored in a non-volatile management database and/or in a volatile memory The FS object may also maintain a consumed slices counter that indicates the total space consumed by FS 116 (i.e., the actual size of FS 116). In one embodiment, the amount of allocated or consumed slices for an FS 116 may be received by a slice manager, e.g., at initialization, after a system restore, or a slice operation. In one embodiment, the FS manager may update the counter when a slice is allocated or de-allocated. In one embodiment, the consumed slices counter may be stored in a volatile memory (e.g., RAM). In another embodiment, the consumed slices counter may be stored in a non-volatile management database and/or in a volatile memory.

The FS manager may use the total FS reservation counter and the allocated slices counter in computing the number of reservations left to allocate for FS 116 (e.g., total FS reservations−allocated slices=reservations left to be allocated). In one embodiment, if FS 116 (or a client controlling FS 116) requests more slices than reserved, the FS manager (or other module) may deny the allocation request and provide an appropriate error message to client (e.g., without the request reaching the slice manager). In another embodiment, the FS manager (or other module) may request that the reservation amount be increased to accommodate the allocation request. If slice manager can increase the reservation amount, then the allocation request may be granted. For example, if non-reserved slices are available (e.g., if there are a greater amount of free slices than total slice reservations), slice manager may increase the reservation amount and grant the allocation request.

In one embodiment, the slice manager (SM) is responsible for allocating slices to slice owning entities (e.g., FSs 116), and may also maintain one or more SM pool objects. Each SM pool object represents information about slices in a storage pool 102, and may include one or more reservation counters for use in determining whether to allow or deny reservations. In one embodiment, an SM pool object includes a SP1 pool reservation counter that indicates the sum of all the file system reservations in a pool where SP1 is handling the reservations and a SP2 pool reservation counter that indicates the sum of all the file system reservations in a pool where SP2 is handling the reservations.

In one embodiment, the slice manager may receive parameters (e.g., reservation counters) from other modules or subsystems using particular interfaces. In one embodiment, SP1 and SP2 pool reservation counter values are passed to the slice manager by the pool manager. Slice manager may also pass reservation statistics to the pool manager. For example, values may be exchanged between subsystems based on various actions, such as during system initialization when a pool is entering a ready state, after a system restore, or after performing a slice operation.

The slice manager may maintain reservation counters for reserved storage that is yet to be allocated. In one embodiment, a SM pool object includes an SP1 remaining pool reservation counter that indicates the sum of all the file system reservations left to allocate in a pool where SP1 is handling the reservations and an SP2 remaining pool reservation counter that indicates the sum of all the file system reservations left to allocate in a pool where SP2 is handling the reservations. In one embodiment, the remaining pool reservation counters may be derived using T-sectors 120 as described in detail below. The slice manager may update the counters based on various actions, e.g., when slices are allocated or de-allocated. In one embodiment, the slice manager counters may be stored in a volatile memory (e.g., RAM). In another embodiment, the slice manager counters may be stored in a non-volatile management database and/or in a volatile memory.

Reservation statistics in a T-sector 120 may be updated by a storage system, or modules therein (e.g., a control module). However, updating statistics may present potential issues. For instance, during a reserved slice allocation, a slice manager may select a slice and update the slice's SAT entry persistently to mark that slice as allocated. If the reservation statistics in a T-sector 120 is updated persistently before the slice manager updates the slice's SAT entry, a fault after updating T-sector 120 may cause slice reservation statistics to be inaccurate. For example, since no context about the allocation operation is stored persistently to recover or finish the operation, the reservation statistics in T-sector 120 may show one extra reserved slice as allocated after a fault. Similarly, updating a T-sector 120 after the slice manager updates its SAT entry persistently may cause slice reservation statistics to be inaccurate if a fault occurs after updating SAT but before updating T-sector 120 persistently. In this case, the reservation statistics in T-sector 120 may show one less reserved slice as allocated than the actual number of reserved slices allocated.

To address such issues and to accurately update the slice reservation statistics in a T-sector 120, storage system, or modules therein (e.g., a slice manager), may use a two phase commit process in updating the reservation statistics in a T-sector. A first phase (referred to herein as the intent phase) may include storing the context of a reserved slice operation in SOTP 204 before processing the operation request. This is followed by processing of the slice operation which may involve updating a slice allocation table (SAT) persistently. For example, an atomic-sized entry in the SAT may be updated to indicate that an associated slice is allocated and uncommitted. Additional details regarding updating a SAT persistently may be found in the co-pending, application Ser. No. 12/751,707, filed on Mar. 31, 2010, which is incorporated herein in its entirety. After the operation is completed successfully, a second phase (referred to herein as the commit phase) may be triggered. During the commit phase, the reservation statistics in T-sector 120 may be updated and the operation tracking portion may be cleared. In one embodiment, writing to or reading from T-sector 120 may be performed as an atomic operation and information stored in T-sector 120 may be persistent.

It will be appreciated that T-sectors 120 and their usage may vary based on a variety of factors (e.g., system configuration, users, and reliability). In one example, a T-sector 120 may include fewer, additional, or different portions and parameters. Further, T-sectors 120 may be used in additional or similar aspects of statistics tracking and are within the scope of the present subject matter disclosed herein.

Figure 3:
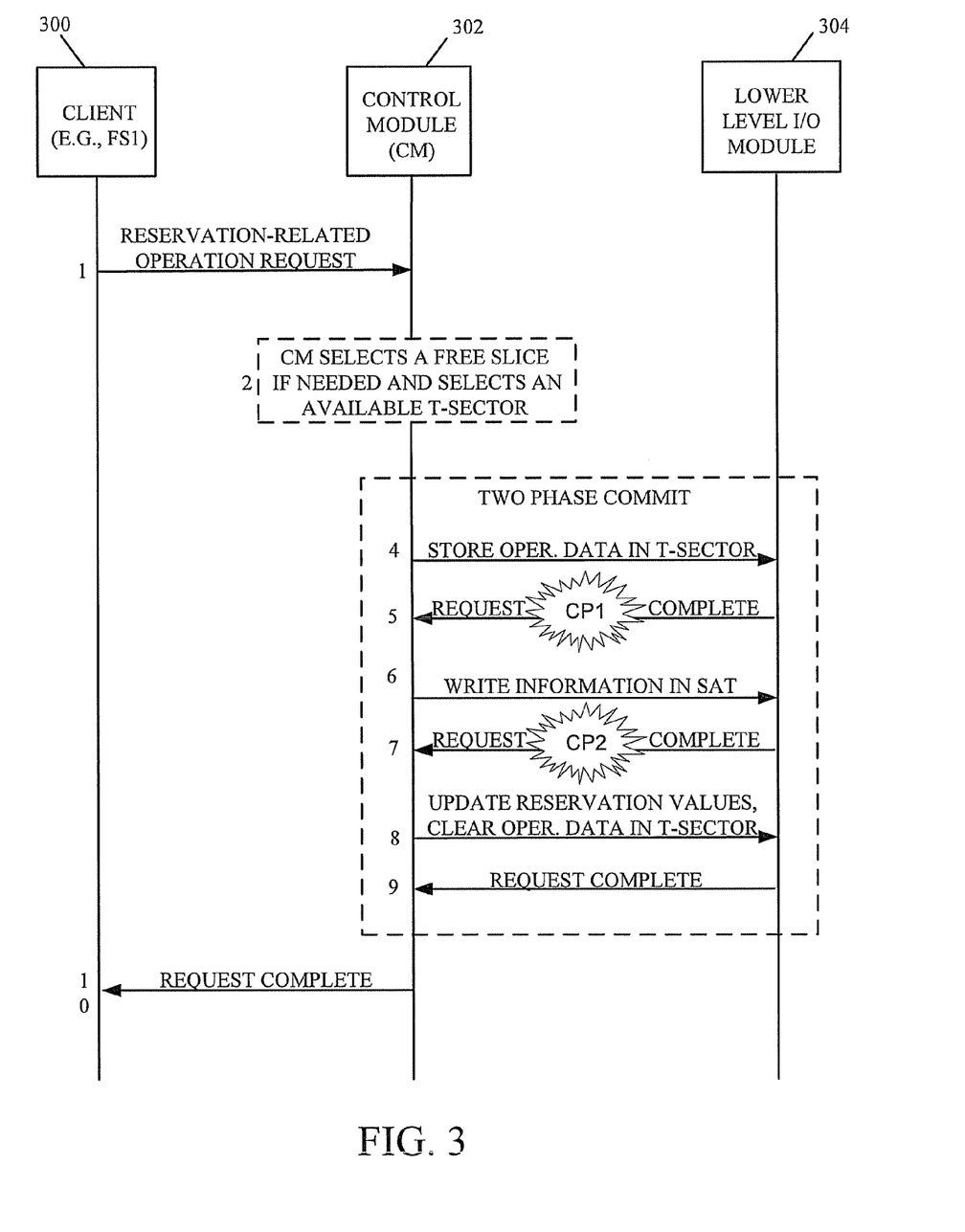
FIG. 3 is a message flow diagram illustrating an exemplary two-phase commit according to an embodiment of the subject matter described herein.

FIG. 3 is a message flow diagram illustrating exemplary messages associated with performing a two-phase commit according to an embodiment of the subject matter described herein. Referring to FIG. 3, in line 1 of the message flow diagram, a client 300 sends a reservation-related operation request message (e.g., a slice allocation request that affects slice reservation statistics if completed or a user reservation request for reserving slices for a FS) to a control module 302. As used herein, control module 302 refers to one or more modules (e.g., a slice manager that handle slice allocation and de-allocation, an FS manager that handles file systems, a tracking system for tracking slice owners' operations and related information, and a pool manager that handles storage devices organized into unified storage space) for performing storage system functionality, or one or more portions therein. In one embodiment, control module 302 includes software that is executed on a SP of a storage array. In line 2, control module 302 selects an available T-sector. In one embodiment, control module 302 is not required to use a same T-sector for a same client, transaction type, or slice. Instead, control module 302 may select any available T-sector within the associated storage pool. In alternative embodiment, control module 302 In one embodiment, selecting a T-sector includes claiming or otherwise indicating to the storage system, or modules therein, that the T-sector is currently in use and not available for other purposes.

If the request involves allocating a slice, control module 302 may select a free slice using slice statistics that are maintained for use during the execution of the storage system (e.g., in fast, volatile RAM memory). For example, slice selection may include inspecting statistics for determining that free slices are available and that a given client (e.g., an FS) has reserved slices left to allocate. In one embodiment, determining and/or selecting a slice may occur before or simultaneously with determining and/or selecting a T-sector. In an alternative embodiment, determining and/or selecting a slice may occur after determining and/or selecting a T-sector.

Control module 302 and lower level input/output (LLIO) module 304 (colloquially referred to as C-clamp lower arm) may be involved in a two phase commit process. As stated above, the two phase commit process may include an intent phase and a commit phase. In line 3, at an intent phase, control module 302 initiates a T-sector update message towards LLIO module 304 for storing context information related to the request. LLIO module 304 may persistently store the context information in an SOTP portion of the selected T-sector.

In one embodiment, context information may include information for rolling back or rolling forward an incomplete operation if a fault occurs. For example, where a request is a slice allocation request, context information may include a slice ID for identifying a slice for allocation, a slice owner identifying the receiver of the slice (e.g., a FS), an operation type identifier that indicates a slice allocation operation is to be performed, and a reservation delta for indicating the respective change in reservation statistics if the operation is completed successfully.

In a second example, where a request is a slice de-allocation request, context information may include a slice ID for identifying a slice indicated in the request for de-allocation, a slice owner ID identifying the client 300 or slice owner requesting the de-allocation (e.g., a FS), an operation type identifier that indicates a slice de-allocation operation is to be performed, and a reservation delta for indicating the respective change in reservation statistics if the operation is completed successfully.

In a third example, where a request is a user reservation request, context information may include a slice owner ID identifying the client 300 or appropriate entity (e.g., a FS), an operation type identifier that indicates a reservation update operation is to be performed, and a reservation delta for indicating the respective change in reservation statistics if the operation is completed successfully. For example, a user reservation request may be initiated by a user of FS 116 for increasing or decreasing the total amount of slices reserved for FS 116. In one embodiment, a reservation request may be initiated by entities other than a user of FS 116, e.g., control module 302, a compression engine, or other modules. For example, a compression engine may request reserved storage for storing an FS (e.g., DLU) or other data collection into a TLU while performing compression.

In one embodiment, bulk slice operations may be performed by performing individual slice operations multiple times, including performing a two phase commit transactions, or portions thereof, multiple times.

In line 5, after storing information in the T-sector, LLIO module 304 sends or attempts to send an acknowledgement or "request complete" message to control module 302. In one embodiment, if a fault (represented by crash point (CP) 1 in FIG. 3) occurs after the context information is persistently stored in the T-Sector but before updating the SAT, the context information may be used to restore slice reservation statistics as described below.

In line 6, after receiving an acknowledgement message and if the request involves slice allocation or slice de-allocation, control module 302 sends an SAT update message towards LLIO module 304 for storing information about a slice allocation status. For example, an SAT update message may trigger LLIO module 304 to persistently store information in an atomic-sized entry in the SAT portion of an LU that indicates a slice is to be allocated or de-allocated (e.g., "ALLOCATED—UNCOMMITTED") and may include slice owner ID and SP ID information associated with the slice.

In line 7, LLIO module 304 sends or attempts to send an acknowledgement or "request complete" message to control module 302. In one embodiment, if a fault (represented by crash point (CP) 2 in FIG. 3) occurs after context information is persistently stored in the T-Sector and the SAT is persistently updated with slice allocation status information for a particular slice, but before slice reservation statistics are updated (e.g., in an RTP portion of the T-sector and in one or more management databases), the context information may be used to restore slice reservation statistics as described below.

After persistently storing information in the T-sector and the SAT, the intent phase may be complete. Control module 302 may then process the request. For example, as described in the incorporated co-pending application Ser. No. 12/751,707, processing the request may include one or more of the following steps: updating the in-memory statistics to reflect the allocation of the selected slice, processing a related I/O write request, scheduling a post-I/O management process to be performed asynchronously, and updating the slice allocation table to indicate that the post-I/O management process for the selected slice is pending. In one embodiment, processing the request may also include performing the post-I/O management process and updating the slice allocation table to indicate that the post-I/O management process for the selected slice has been performed. A commit phase may be triggered after processing and/or completing the request.

During the commit phase, reservation slice statistics may be updated in the T-sector. In line 8, after receiving an acknowledgement message, control module 302 sends a T-sector release message towards LLIO module 304 for updating slice reservation statistics (e.g., in an RTP section of the T-sector) and for clearing the context information stored in the T-sector (e.g., in an SOTP section of the T-sector). For example, after an allocate slice operation has been performed, control module 302 or other appropriate entities may direct that statistics in RAM be updated and a consumed reserved slice amount in the T-sector be increased by one. In a second example, after a de-allocate slice operation has been performed, control module 302 or other appropriate entities may direct that statistics in RAM be updated and a consumed reserved slice amount in the T-sector be decreased by one. After performing these functions, control module 302 may release or unclaim the T-sector. After release, the T-sector may be available for handling other transactions.

In line 9, LLIO module 304 sends an acknowledgement or "request complete" message to control module 302. In line 10, control module 302 sends an acknowledgement or "request complete" message to client 300. After receiving the acknowledgement message, client 300 may update one or more slice reservation statistics (e.g., at a management database) that it maintains.

Faults (some faults are shown as crash points (CPs) in FIG. 3) may cause operations and statistics to be in an unfinished and/or unreliable state. In one embodiment, a recovery process may be initiated to restore slice reservation statistics and/or to roll forward or roll back operations that were not completed before the fault. In one embodiment, control module 302 (e.g., a slice manager) may initiate the recovery process after LUs associated with the storage pool are ready or available for inspection. Control module 302 may provide an interface to clients 300 for notifying control module 302 that a pool construction process is complete. In one embodiment, clients 300 may inform, via a pool construction complete notification message, a control module 302 that all LUs are added to a storage pool and that the storage pool is ready for inspection. After notification, a recovery process may be initiated. In the recovery process, control module 302 may inspect T-sectors for pending or unfinished operations (e.g., Control module 302 may search for in-use T-sectors, such as T-sectors with SOTP portions that have context information). Control module 302 may roll forward or roll backward unfinished operations so that unfinished operations are resolved and T-sectors can be made available for handling new transactions.

Actions performed by control module 302 upon finding an in-use T-sector (i.e., an unfinished operation) may depend on a variety of factors, such as the allocation status of a slice and the operation type performed on that slice as recorded in the T-sector. It will be appreciated control module 302 may also inspect or analyze the SAT for slice allocation status (e.g., allocated or un-allocated) of any slices identified in T-sectors (e.g., as identified by slice ID parameters of SOTP portions of T-sectors) when determining how to handle unfinished operations.

Table 2 shows exemplary actions that control module 302 may perform for handling unfinished operations caused by faults. As shown in Table 2, slice allocation (e.g., reserve) operations may generally be rolled forward if a slice is allocated (e.g., as determined by a persistent SAT entry). In one embodiment, rolling forward an operation may include completing a commit phase, such as clearing context information from a T-sector and increasing slice reservation statistics. Increasing slice reservation statistics may include increasing a reservation statistic in T-sector and may also include increasing statistics stored in other locations and in other memory (e.g., statistics in management database objects may be updated).

TABLE 2

Exemplary Actions for Handling Unfinished Operations

| Crash Point with Respect to FIG. 2 | T-sector Operation Type | Slice State | Action(s) Taken in Control Manager |
|---|---|---|---|
| Crash point 1 | Reserve (ex. Allocate Slice) | Not Allocated | Clear SliceID, Operation, OwnerID Write T-sector Retry Operation (e.g., initiated by storage system) |
| Crash point 1 | Un-Reserve (ex. Release Slice) | Allocated | Clear SliceID, Operation, OwnerID Write T-sector Retry Operation (e.g., initiated by storage system) |
| Crash point 2 | Reserve (ex. Allocate Slice) | Allocated | Clear SliceID, Operation, OwnerID Increment Reservation Count by one Write T-sector |
| Crash point 2 | Un-Reserve (ex. Release Slice) | Not Allocated | Clear SliceID, Operation, OwnerID Decrement Reservation Count by one Write T-sector |
| Crash point 1 and Crash point 2 are not applicable | Decrease or Increase Reservation | Not Applicable | Increment or decrement the reservation count based on the reservation delta |

Slice allocation (e.g., reserve) operations may generally be rolled backward if a slice is not allocated. In one embodiment, rolling backward an operation may include reverting a T-sector back to a state before the operation was attempted, such as clearing context information from a T-sector and leaving slice reservation statistics unchanged. Rolling backward may also include reverting other statistics and information stored in various locations (e.g., information in an SAT entry). In one embodiment, after rolling back an operation, a control module 302, or other entity, may initiate a retry operation to complete the rolled back operation. In an embodiment where a retry operation is initiated by the storage system, the same T-sector may be cleared and reused for the retry operation. In an alternate embodiment, after rolling back an operation, the reverted T-sector may be unclaimed or otherwise made available for use to the storage system (i.e., control module 302). In the alternative embodiment, control module 302 may place a retry operation into a queue until a T-sector is made available.

Slice de-allocation (e.g., un-reserve) operations may generally be rolled forward if a slice is not allocated and may generally be rolled backward if a slice is allocated (e.g., as determined by a persistent SAT entry). Additional operation types shown in Table 2 involve reservation increases and decreases. These operations may be for increasing or decreasing a total amount of reserved slices. As described in greater detail below, reservation increase or decrease operations may generally be rolled forwarded using reservation delta parameters stored in the T-sector.

While some fault occurrences are depicted and discussed, it will be appreciated that fault occurrences may vary and that handling any faults using T-sectors and/or other persistent memory data structures for tracking reservations is within the scope of the present subject matter described herein.

As stated above, reservation slice statistics can be affected through various operations, such as slice allocation, slice de-allocation, and user (e.g., FS) reservations. Generally, control module 302 may maintain slice reservation statistics and update the statistics when needed. However, some operations or requests may require clients to initiate updating statistics. For example, a user may attempt to reduce a total reserved slice amount of an FS below the FS's allocated slice amount. In such an example, client 300 may be expected to inform control module 302 and/or initiate the updating of slice reservation statistics maintained by control module 302.

Control module 302 may provide various interfaces for clients 300 to update or otherwise affect slice reservation statistics. In one embodiment, control module 302 may provide an interface for clients 300 to update reservation counters maintained by control module 302. In particular, control module 302 may provide operations to check-out and check-in reservation counters of control module 302. For example, control module 302 may maintain a counter representing how many slices affined to a given SP that are reserved and may also maintain an amount representing how many of those slices are consumed or allocated. In a scenario where a reservation update or other action may cause slice reservation statistics (e.g., reserved storage consumption statistics maintained in the T-sectors) to become inaccurate, clients 300 may update or initiate updating, using the check-in and check-out operations, one or more reservation counters. For example, control module 302 may be triggered to update slice reservation statistics stored in a T-sector so that the T-sectors accurately represent slice reservation statistics. Additional discussion of check-in and check-out functionality will be discussed in reference to FIG. 4.

Control module 302 may also provide an interface for clients 300 to pause and resume storage-related operations. Control module 302 may provide pause and resume functionality so that slice statistics associated with a slice owner (e.g., an FS) are not modified while a client 300 is trying to change the amount of reserved slices for the slice owner (e.g., FS). That is, pause and resume functionality may be useful when supporting parallel updates to reservation statistics (e.g., counters) using T-sectors. For example, a FS may have multiple requests in a processing queue. If such completed requests will affect slice reservation statistics (e.g., slice allocation requests), then processing a request via one T-sector while a client 300 is attempting to update reservation statistics via a second T-sector, may cause inconsistency in one or more reservation statistics (e.g., a consumption value and a total reserved value). For example, in one embodiment, a client 300 may request and received certain statistics from control module 302 for performing calculations related to updating reservation statistics. If another operation is performed and statistics are changed between when the statistics are received and when the update process is completed, reservation statistics stored in T-sectors may become inaccurate. Thus, to maintain consistent and accurate statistics throughout the update reservation process, pause and resume functionality may be implemented per slice owner.

Clients 300 may initiate a pause request when attempting to initiate updating reservation statistics via check-out and check-in operations. Upon receiving the pause request, control module 302 may start a pausing process for transitioning a slice owner into a paused state. In one embodiment, a pausing process includes performing any outstanding operations associated with the slice owner and queuing all operations associated with the slice owner that are received after the pause request.

In one embodiment, control module 302 may maintain different queues for different slice operations. The different queues may be used to prioritize operations based on their type. For example, a control module 302 may have three processing queues, such as an allocate slice queue, a commit slice queue, and a release slice queue. Control module 302 may implement a consistent pause across all the queues using counters. For example, control module 302 may calculate or count all in-progress operations in the three queues on both SPs.

Queues may be protected by a spin-lock or other synchronization mechanisms. In one embodiment, one or more synchronization mechanisms may prevent changes (e.g., additions or removals) occurring within the queues while the operations are counted in each queue. Control module 302 may store this count information in a slice owner tracking element. Tracking elements are used by a tracker for implementing pause and resume functionality. Tracking system details are further discussed below in reference to FIG. 5.

Once the counters are recorded in the tracker, control module 302 may resume processing outstanding operations in the queues and the counters may be decremented accordingly. When all the counters reaches zero, the slice owner may be marked or otherwise indicate as being in a paused state. When a resume operation for slice owner is requested, control module 302 may reactivate or replay operations in the paused list. For example, control module 302 may reactivate or replay all the operations in the paused list associated with the slice owner. For example, control module 302 may place un-paused operations at the heads of appropriate queues on both SPs and mark the slice owner as not being in a paused state.

Figure 4:
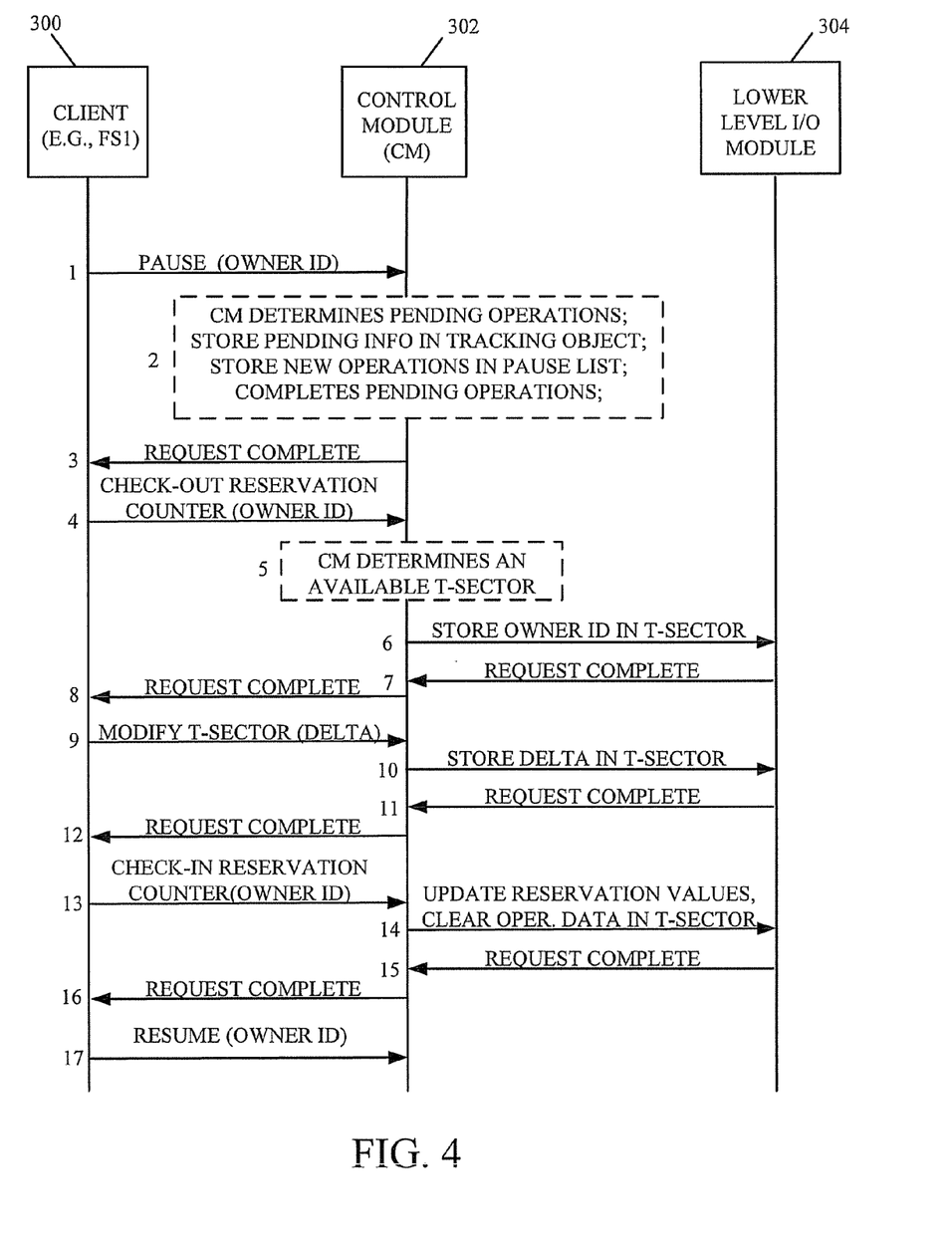
FIG. 4 is a message flow diagram illustrating exemplary messages associated with various interfaces for updating reservation statistics according to an embodiment of the subject matter described herein.

FIG. 4 is a message flow diagram illustrating exemplary messages associated with various interfaces for updating reservation statistics according to an embodiment of the subject matter described herein. Referring to FIG. 4, in line 1 of the message flow diagram, a client 300 sends a pause request that includes a slice owner ID to a control module 302.

In line 2, in response to receiving a pause request, a control module 302 may initiate a pause process for pausing of operations associated with the slice owner identified by the slice owner ID. In one embodiment, pausing operations associated with a slice owner includes processing any outstanding operations associated with the slice owner and pausing or queuing all new operations. In one embodiment, processing outstanding operations includes depleting operations (e.g., by completing the operations) that are in processing queues at the time the pause request is received. In one embodiment, queuing new operations includes placing operations that are received after the pause request into a pause list or queue for future processing. Counters for queues may be stored in a slice owner tracking element (described further below) and may be updated as operations are processed. In one embodiment, when all counters reaches zero, control module 302 may mark or otherwise indicate to the storage system that the slice owner is in a pause state. In line 3, control module 302 sends an acknowledgement or "request complete" message to client 300 for indicating that operations associated with the slice owner are paused.

In line 4, client 300 sends a check-out reservation counter request to control module 302. In one embodiment, the checkout request may include a slice owner ID for identifying a slice owner that is requesting a reservation decrease or increase. In line 5, control module 302 may determine an available T-sector and may claim or mark the T-sector for exclusive use. In line 6, control module 302 sends a T-sector update request message to lower level input/output (LLIO) module 304. The update message may include the slice owner ID received from client 300. LLIO module 304 may store the slice owner ID information in the T-sector (e.g., at a SOTP portion). In line 7, LLIO module 304 sends an acknowledgement or "request complete" message to control module 302. In line 8, control module 302 sends or forwards an acknowledgement or "request complete" message to client 300 indicating that a T-sector has been check-out is available to complete a reservation update. In line 9, after receiving the acknowledgement message, client 300 sends a T-Sector modify request for storing a reservation delta value.

As stated above, reservation delta amounts may represent a change in reservation statistics. In one embodiment, client 300 calculates the delta using the following equation: Delta=Owner's Total Reserved Space−Owner's Current Allocated Space. In the above equation, the variable Owner's Total Reserved Space may be a statistic maintained by client 300 and the variable Owner's Current Allocated Space may be a statistic maintained by control module 302 and client 300.

Since module 302 and client 300 may update their respective values at different times, the two values for an owner's current allocated space may not always be consistent. To ensure consistency, in one embodiment, client 300 may request and receive the owner's current allocated space value maintained by control module 302. Client 300 may use this value in computing the reservation delta. For example, if client 300 wants a total reservation space of 45 slices and has a current allocated space of 50 slices as determined by control module 302, a reservation delta of −5 is computed (i.e., 45−50=−5).

In line 10, control module 302 sends a T-sector update message towards LLIO module 304 for storing the reservation delta amount computed by client 300. LLIO module 304 may persistently store the reservation delta amount in an SOTP portion of the selected T-sector. In line 11, LLIO module 304 sends an acknowledgement or "request complete" message to control module 302. In line 12, control module 302 sends an acknowledgement or "request complete" message to client 300. In line 13, client 300 sends a check-in reservation counter request message. The check-in message may include a slice owner ID for identifying the in-use T-sector.

In line 14, in response to receiving a check-in message, control module 302 sends a T-sector release message towards LLIO module 304 for updating slice reservation statistics (e.g., in an RTP section of the T-sector) and for clearing the context information stored in the T-sector (e.g., in an SOTP section of the T-sector). For example, LLIO module 304 may decrease a consumed reserved slice amount in the T-sector by the amount of reservation delta. After performing these functions, control module 302 may release or unclaim the T-sector. After release, the T-sector may be available for handling other transactions. In line 15, LLIO module 304 sends an acknowledgement or "request complete" message to control module 302. In line 16, control module 302 sends an acknowledgement or "request complete" message to client 300.

In step 17, client 300 sends a resume operation message to control module 302 for un-pausing operations associated with the slice owner. In one embodiment, when a resume operation is requested, control module 302 may reactivate or replay all the operations in the paused list associated with the slice owner. For example, control module 302 may place un-paused operations at the heads of appropriate queues on both SPs. Control module 302 may mark or otherwise indicate to the storage system that the slice owner is no longer in a paused state. After receiving the acknowledgement message, client 300 may update one or more of its slice reservation statistics (e.g., at a management database that it maintains). In an alternative embodiment, client 300 may update one or more of its slice reservation statistics after sending a check-in message, receiving a confirmation that check-in is complete, or sending a resume request.

Figure 5:
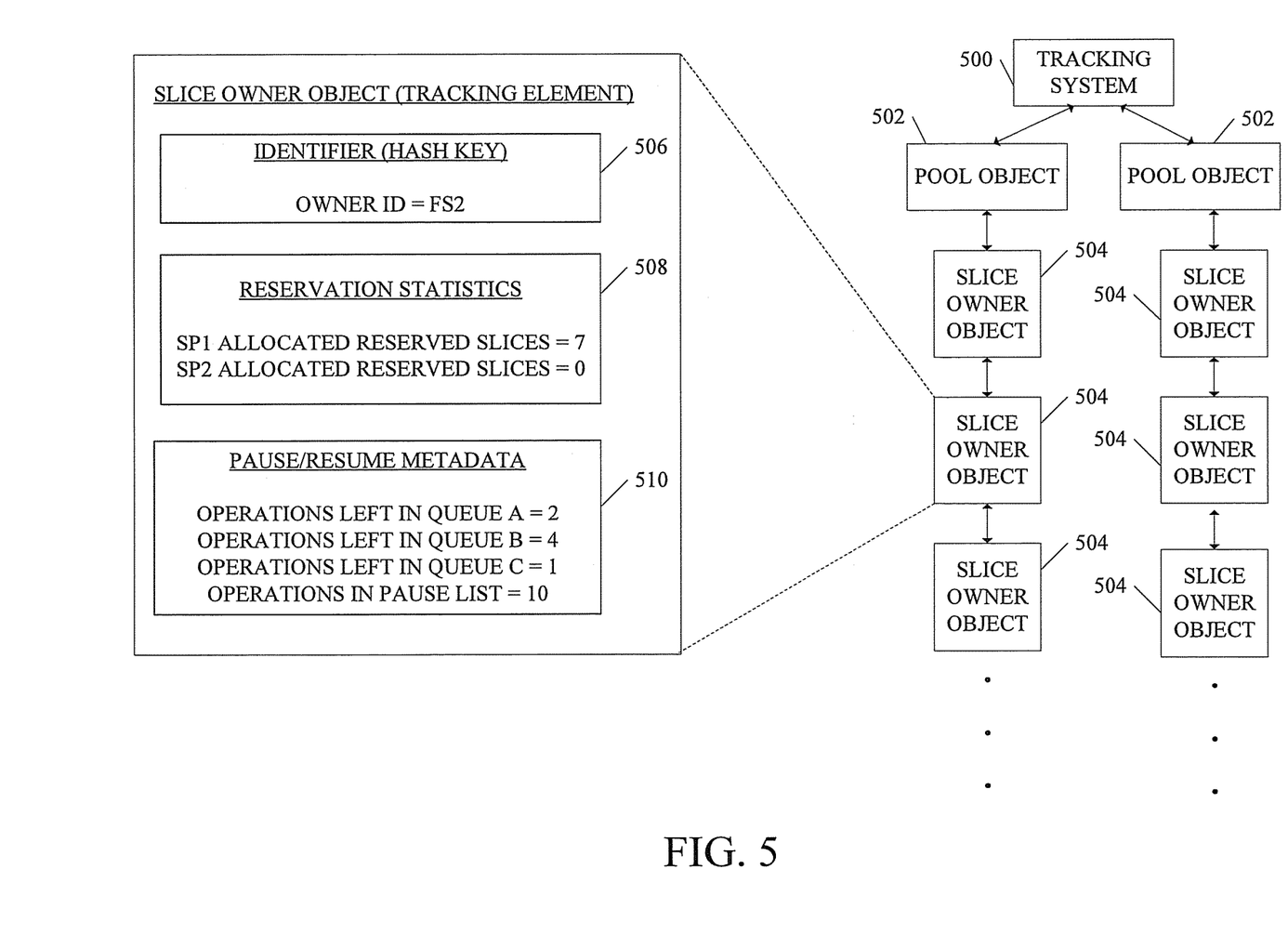
FIG. 5 is a block diagram illustrating an exemplary slice owner tracking system according to an embodiment of the subject matter described herein.

FIG. 5 is a block diagram illustrating an exemplary system for tracking operations of slice owners according to an embodiment of the present subject matter described herein. In FIG. 5, a light weight tracking system 500 is depicted. In one embodiment, system 500 may be located in and/or maintain by a control module (e.g., a slice manager) in a storage system. Tracking system 500 may track information for slice owners, such as FSs. In one embodiment, tracking system 500 may track owners from one or more storage pools. In the embodiment illustrated in FIG. 5, tracking system 500 may track owners for all storage pools in a storage system. Tracking system 500 may be implemented in a storage system that has a maximum number of slice owners (e.g., file systems) but no specified limit in regards to the number of slice owners that can be created per pool. For example, a single pool may contain the maximum number of slice owners. As shown in FIG. 5, tracking system 500 manages two pool objects 502. Each pool object may be a data structure that includes information related to the storage pool. In one embodiment, each pool object may include a hash table, list, and/or other data structure for storing or providing memory pointers to slice owner objects (also referred to as tracking elements) 504. For example, a pool object may include slice owner objects (tracking elements) 504 that are configured as doubly-linked lists. In a second example, tracking elements 504 may be part of a hash table.

Each tracking element 504 may include information related to a slice owner (e.g., a file system). In the embodiment shown in FIG. 5, each tracking element 504 may include a unique slice owner identifier (ID) 506. For example, a slice owner ID 506 may indicate a particular file system associated with the pool. In one embodiment where tracker elements 504 are in a hash table, the slice owner ID 506 may be used as a key for a hashing algorithm. A tracking element 504 may also include space consumption statistics 508 and other metadata 510. In the embodiment shown in FIG. 5, space consumption statistics 508 may include statistics for reserved slices that are consumed (i.e., allocated) and may be maintained for each SP. For example, as shown in FIG. 5, slice owner "FS2" may have seven slices of some reserved slice amount that are allocated by SP1 and zero slices that are allocated by SP2.

Metadata 510 may be used to support pause and resume functionality. For example, metadata 510 may include one or more counters, statistics, and/or memory pointers for tracking in-progress operations (e.g., operations that are pending before a pause request is initiated). Metadata 510 may also include one or more counters and/or statistics for tracking information related to a pause list. For example, metadata 510 may include a counter for tracking operations added to the pause list and may contain memory pointers or other information indicating which operations are in the pause list.

In one embodiment, tracking system 500 may use SAT entries or other persistent information for populating the system on a system reboot or other scenarios (e.g., an SP crash) where information in tracking system 500 may be unreliable. It will be appreciated that tracking system 500 may be synchronized and/or consistent across storage system. For example, information stored in tracking system 500 may be consistent for all SPs in a storage system. In one embodiment, tracking system 500, and portions therein, may use locks and/or other synchronization mechanisms to prevent problems involving simultaneous writes and reads. For example, tracking system 500 may be accessed using a spin lock and each tracking element 504 may be accessed using a second lock.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for tracking pool storage space reservations, the system comprising:
   at a storage entity having a pool of data storage space for storing data, the data storage space being divided into a plurality of slices:
      one or more portions of non-volatile memory, different from the data storage space, for storing slice reservation statistics and information about requests that affect slice reservation statistics, wherein the slice reservation statistics include information for determining an amount of reserved, unallocated slices; and
      a control module, implemented by a processor, for receiving an allocation or de-allocation request that affect slice reservation statistics, storing information about the allocation or de-allocation request in the portion of non-volatile memory, wherein storing the information about the allocation or de-allocation request in the portion of non-volatile memory is an atomic operation such that partial storage of the information is prevented, performing the allocation or de-allocation request, and updating the slice reservation statistics and clearing the information about the allocation or de-allocation request in the portion of non-volatile memory.

2. The system of claim 1 wherein each portion of the non-volatile memory is of a size that is updatable with a single input/output (I/O) write.

3. The system of claim 1 wherein each portion of the non-volatile memory contains one or more reservation counters for storing amount of reserved storage that has been allocated.

4. The system of claim 3 wherein a summation of reservation counters from the portions of non-volatile memory provides a total amount of reserved storage that has been allocated.

5. The system of claim 1 wherein the control module is configured to detect a fault condition and, in response to a fault condition, access the portions of non-volatile memory to identify requests that are pending and to determine slice reservation statistics for one or more components in the storage entity.

6. The system of claim 5 wherein detecting the fault condition comprises at least one of a detection of a power failure and a determination that in-memory statistics are unreliable.

7. The system of claim 1 wherein before storing information about the allocation or de-allocation request in a portion of non-volatile memory that stores slice reservation statistics, the control module is configured to claim the portion of non-volatile memory for exclusive use in processing the allocation or de-allocation request.

8. The system of claim 7 wherein after updating the slice reservation statistics and clearing the stored information about the allocation or de-allocation request in the portion of non-volatile memory, the control module is configured to unclaim the portion of non-volatile memory.

9. The system of claim 7 wherein a slice owning entity initiates a pause process for pausing operations associated with the entity, wherein the pause process is completed before the claiming of the portion of non-volatile memory.

10. The system of claim 8 wherein a slice owning entity initiates a resume process for resuming paused operations associated with the entity after the unclaiming of the portion of non-volatile memory.

11. The system of claim 1 comprising:
    a tracking system for tracking operations and slice statistics associated with a slice owning entity.

12. A method for tracking pool storage space reservations, the method comprising:
    at a storage entity having data storage space for storing data, the data storage space being divided into a plurality of slices:
       receiving an allocation or de-allocation request that affects slice reservation statistics, wherein the slice reservation statistics include information for determining an amount of reserved, unallocated slices;
       storing information about the allocation or de-allocation request in a portion of non-volatile memory that stores slice reservation statistics, wherein storing the information in the portion of non-volatile memory is an atomic operation such that partial storage of the information is prevented;
       performing the allocation or de-allocation request; and
       updating the slice reservation statistics and clearing the stored information about the allocation or de-allocation request in the portion of non-volatile memory.

13. The method of claim 12 wherein each portion of the non-volatile memory is of a size that is updatable with a single input/output (I/O) write.

14. The method of claim 12 wherein each portion of the non-volatile memory contains one or more reservation counters for storing amount of reserved storage that has been allocated.

15. The method of claim 14 wherein a summation of reservation counters from the portions of non-volatile memory provides a total amount of reserved storage that has been allocated.

16. The method of claim 12 comprising:
    detecting a fault condition; and
    in response to detecting the fault condition, accessing one or more portions of non-volatile memory to identify requests that are pending and to determine slice reservation statistics for components in the storage entity.

17. The method of claim 16 wherein detecting the fault condition comprises at least one of a detection of a power failure and a determination that in-memory statistics are unreliable.

18. The method of claim 12 wherein before storing information about the allocation or de-allocation request in a portion of non-volatile memory that stores slice reservation statistics, claiming the portion of non-volatile memory for exclusive use in processing the allocation or de-allocation request.

19. The method of claim 18 wherein after updating the slice reservation statistics and clearing the stored information about the allocation or de-allocation request in the portion of non-volatile memory, unclaiming the portion of non-volatile memory.

20. The method of claim 12 wherein a slice owning entity initiates a pause process for pausing operations associated with the entity, wherein the pause process is completed before the claiming of the portion of non-volatile memory.

21. The method of claim 19, wherein a slice owning entity initiates a resume process for resuming paused operations associated with the entity after the unclaiming of the portion of non-volatile memory.

22. The method of claim 12 wherein a tracking system is used for tracking operations and slice statistics associated with a slice owning entity.

23. A non-transitory computer readable medium having stored thereon executable instructions that when executed by the processor of a computer control the computer to perform steps comprising:

at a storage entity having data storage space for storing data, the data storage space being divided into a plurality of slices:

receiving an allocation or de-allocation request that affects slice reservation statistics, wherein the slice reservation statistics include information for determining an amount of reserved, unallocated slices;

storing information about the allocation or de-allocation request in a portion of non-volatile memory that stores slice reservation statistics, wherein storing the information in the portion of non-volatile memory is an atomic operation such that partial storage of the information is prevented;

performing the allocation or de-allocation request; and updating the slice reservation statistics and clearing the stored information about the allocation or de-allocation request in the portion of non-volatile memory.

* * * * *